Dec. 26, 1961   J. E. MARTENS   3,014,380
MOTION-TRANSMITTING DEVICE
Filed Dec. 15, 1958   2 Sheets-Sheet 1

INVENTOR.
JACK E. MARTENS
BY W. E. Recktenwald
a. A. McFadyen
C. S. Penfold
ATTORNEY Dec. 26, 1961   J. E. MARTENS   3,014,380
MOTION-TRANSMITTING DEVICE Filed Dec. 15, 1958   2 Sheets-Sheet 2

INVENTOR.
JACK E. MARTENS
BY W. E. Recktenwald
A. D. McFadyen
C. S. Penfold
ATTORNEY United States Patent Office 3,014,380
Patented Dec. 26, 1961

3,014,380
MOTION-TRANSMITTING DEVICE
Jack E. Martens, Gary, Ind., assignor to The Anderson Company, a corporation of Indiana
Filed Dec. 15, 1958, Ser. No. 780,514
13 Claims. (Cl. 74—459)

This invention relates to a motion-transmitting device and more particularly to an improved nut assembly for motion-transmitting devices.

Motion-transmitting devices, particularly of the nut-and-screw type, are subject to wear over periods of use because of the bearing loads to which they are continually subjected. The term "wear" as used herein is intended to have at least two connotations; first, the gradual rubbing or rolling away of material due to the contact between the moving parts, and second, the gradual glazing, buffing or smoothing of the contacting surfaces caused by the combined action of the rubbing parts and the bearing loads exerted between the rubbing parts. Some parts wear more quickly than others with the result that the component parts of the device become noisy, inefficient in operation or totally inoperative under load.

When motion-transmitting devices are used to convert rotary motion into translatory motion, still other problems are encountered. When, for example, the end of a translatory movement is reached, as by striking a stop, the output translatory element is often found to bind or otherwise become so impacted on the stop that it is not possible to retract the element back toward its starting point. For instance, a threaded shaft may be rotated as by a motor to move a nut member on the threaded shaft in a translatory or axial direction thereof. When the nut member strikes a stop, particularly if the member rams against the stop in a sudden jarring impact, the nut member may become skewed on the shaft or otherwise bound on the shaft or on the stop. When it is subsequently attempted to reverse the motor and rotate the threaded shaft in the opposite direction, thereby retracting the nut member, it is often found that the motor lacks sufficient power to withdraw the member or becomes overloaded in effecting the reversal.

To avoid the impacting or wedging, it has been suggested to allow the translatory element to rotate freely upon striking a stop or "freewheel" as it is termed herein. It has been proposed that the nut member be permitted to rotate freely or freewheel on the threaded shaft after striking a stop.

The devices known heretofore that do have means for permitting freewheeling are generally far from perfect and do occasionally wedge or jam on the stop or fail to freewheel when engaged by the stop. During wedging, jamming, resistance to freewheeling, and even during freewheeling of some known prior art devices, the load on the motor is substantially increased over the normal load required to drive the nut and screw.

An additional problem encountered in manufacturing and assembling nut-and-screw devices of the type above referred to relates to the requirement of maintaining almost perfect leads on the thread form of the screw member and of maintaining almost identical dimensions on all of the roller elements of the nut member. Failure to maintain either or both of these just-named two requirements results in a unit that cannot be assembled. If it can be assembled it will run in intermittent spurts, starts and jerks, and occasionally will stop altogether. The greater the lead error and/or the greater the deviations from substantially identical dimensions of the roller elements, the greater the problems will be with respect to spurts, starts and jerks. When the lead errors become too great or when the distances between the bearing surfaces of the roller elements become too great, the unit cannot be assembled at all.

The present invention obviates all of the foregoing faults. In this device there is automatic compensation for wear so that the component parts are always maintained in proper alignment for more efficient and quiet operation. The invention controls the positioning of the roller elements relative to the axis of the screw member so that freewheeling of the nut member relative to the screw upon striking a stop will take place substantially every time without wedging or jamming of the nut on the screw or on the stop.

The present invention provides self-adjusting means for compensating both for lead errors in the screw thread and for deviations from pre-established dimensions for the roller elements and the raceway elements so that a nut-and-screw device results that is cheaper to manufacture and assemble, requiring less rigid control of tolerances, more efficient, smoother, quieter operation, and practically no jamming or stalling during normal use.

In addition, the present invention provides a constant reactive pressure between the roller elements and the nut and screw. The reactive forces together with the controlled positioning of the roller elements in the nut combine to produce, in certain forms of the invention, improved freewheeling characteristics which materially do not add any appreciable load to the motor, either during starting or stopping of the freewheeling action or during the freewheeling operation.

Other objects and advantages of the invention will become apparent after the description hereinafter set forth is considered in conjunction with the drawing annexed hereto.

Figure 1:
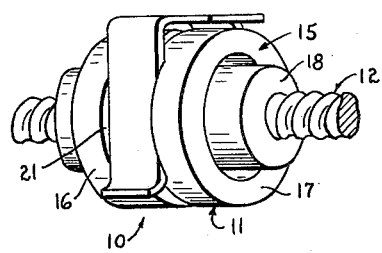
FIGURE 1 is a perspective view of a nut-and-screw type motion-transmitting device embodying my present invention.
Figure 2:
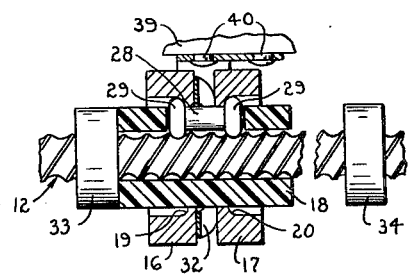
FIGURE 2 is a view partially in cross section of the nut-and-screw device of FIGURE 1 with stops mounted on the screw member.
Figure 3:
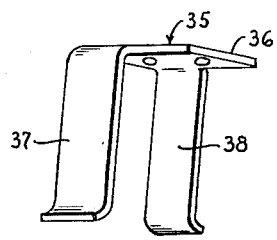
FIGURE 3 is an enlarged exploded perspective view of the nut-and-screw device of FIGURE 1.
Figure 3:
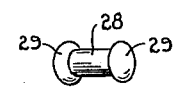
Figure 3:
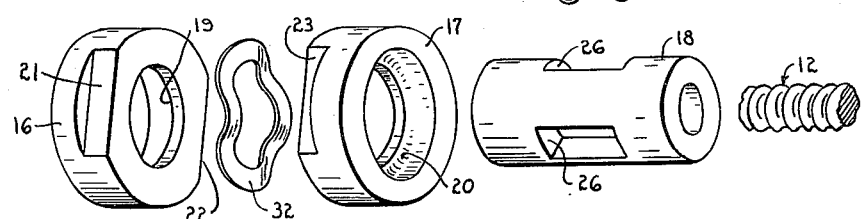
Figure 3:
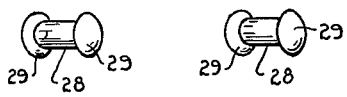

Referring particularly to FIGURES 1–3, a nut-and-screw type motion-transmitting device 10 is illustrated comprising a nut member 11 and a threaded screw member 12, which is generally adapted to be rotated about its longitudinal axis by means of a motor (not shown) or the like. The nut member 11 includes a hollow cylindrical ring member 15 split into two parts or halves 16, 17 and a carrier member 18 adapted to fit loosely within the ring member 15 and to encircle loosely a portion of the screw member 12. Within the hollow of each half 16 and 17 of the ring member 15 is a nut race or raceway 19 and 20, respectively, each one of which face in opposite directions from the other. That is, the race 19 in the half 16 faces in one axial direction which is opposite to the direction of the race 20 in the other half 17 of the ring member 15. The diametrically opposite sides of the outer cylindrical portion of the halves 16 and 17 having mating segments 21, 22 and 23, 24, respectively, cut out along substantially equal length chords lying parallel to each other on opposite sides of the axis of the ring member 15 for a purpose to be described hereinafter.

The carrier member 18 is a hollow cylindrically shaped sleeve member which has a predetermined number of windows or openings 26 formed in the cylindrical walls in equally spaced relation about the circumference thereof. The longitudinal axis of each window 26 lies substantially parallel to the longitudinal axis of the screw 12. A bearing or roller element 28 is adapted to be seated in each window 26 in the carrier 18 with the longitudinal axis of the roller elements lying substantially parallel both to the longitudinal axis of the carrier and to the longitudinal axis of the screw member 12. A pair of enlarged bearing surfaces 29 of the rollers 28 are axially spaced apart a predetermined distance so as to span a preselected number of threads on the screw 12. The number of bearing elements required in any particular nut is in direct proportion to the number of threads on the screw, for instance in the drawings three rollers are shown for use with a triple-lead thread on the screw. With the rollers 28 positioned in the equally spaced windows 26 of the carrier about the screw 12, each bearing surface 29 of each rollers will engage with a different thread on the screw in the illustrated form. The two halves 16 and 17 of the ring member 15 are positioned about the carrier and about the bearing elements 28 with the raceways 19 and 20 of the respective halves positioned between the enlarged bearing surfaces 29 in position to be engaged by said surfaces 29.

Positioned between the adjoining ends of the halves 16 and 17 of the ring member 15 is a resilient member or spring washer 32 which is shown as corrugated or wave shaped and has a plurality of convolutions extending in both directions out of the plane of the washer. The washer is preferably formed of spring-type material which is adapted to urge the halves in an axial direction away from each other when compressed between the two halves 16, 17 of the nut member.

In the assembled condition of FIGURE 2, the carrier 18 is located between the threaded portion of screw 12 and the ring member 15 for positioning the bearing elements 28 about the circumference of the screw in operative contact with both the threads on the screw and with the raceways in the respective halves 16, 17 of the ring member 15. The spring washer 32 is compressed between the halves 16 and 17 of ring member 15 and is urging the respective raceways 19 and 20 into operative contact with the bearing surfaces 29 of the rollers 28. A pair of stop members 33, 34 are rigidly attached to the screw member 12 at opposite ends of the desired stroke of the nut member 11 so that contact of the end face of the carrier 18 of the nut member with one face of either stop 33, 34 will limit further axial movement of the nut member in that direction. It is to be understood that pin-type stops with axially projecting abutments on the ends of the carrier member, or any other means for creating the freewheeling action, could be used in place of the stops 33, 34 without departing from the spirit of my invention.

A U-shaped mounting bracket 35 having a mounting portion 36 and a pair of depending legs 37, 38 is adapted to operatively connect the nut member 15 to a work load 39. The connection is effected by means of a radial gripping of the legs 37, 38 of the bracket 35 with the cutout segments 21, 23 and 22, 24 of the ring member 15 of the nut and by means of screws or rivets 40 passing through the mounting portion 36 of the bracket into engagement with an appropriate portion of the work load 39 intended to be moved or actuated along the axis of the shaft 12.

In operation, rotation of the screw member 12 about its longitudinal axis in either a counterclockwise or clockwise direction moves the nut member 15 along the axis of the screw member between the stops 33 and 34. Due to the constant axially directed urging force of the washer 32 against the halves 16 and 17 of the ring member, an operative contact is created both between the respective raceways 19 and 20 and the enlarged bearing surfaces 29 of the rollers 28 and between the bearing surfaces 29 of the rollers 28 and the threads on the screw member 12. As the bearing surfaces on the threads, on the rollers and/or on the raceways 19, 20 wear ("wear" being used as defined above), there will always be a constant reactive pressure produced by the washer 32 between the rollers and the raceways such that the device will continue to operate smoothly.

At one end of the stroke when the carrier 18 strikes a stop 33, such as illustrated in the left-hand portion of FIGURE 2, the carrier 18 will become locked with respect to the stop 33 and screw 12, whereupon further axial movement of the ring member 15 will cease. The screw 12, stop 33 and carrier 18 rotate together without any translatory motion being transmitted to the ring member 15. The ring member 15 freewheels with respect to the carrier and screw by means of the rollers 28 rolling about their longitudinal axes between the screw 12 and the fixed raceways 19, 20 of the nonrotating ring member 15. The rollers are rotated with the carrier and screw about the axis of the screw whereby no axial force is transmitted to the ring member. With the longitudinal axes of the rollers 28 held substantially parallel to the longitudinal axis of the screw 12 by means of the axially directed forces on the bearing surfaces, a positive and efficient freewheeling is produced. The freewheeling is smooth and does not materially increase the resistance of the shaft 12 to turning, which resistance is normally inherent in prior freewheeling devices. That is, when the carrier 18 contacts a stop, freewheeling of the nut takes place with no noticeable load increase on the motor. Reversal of the direction of rotation of the shaft 12 with the consequent reversal of the direction of movement of the nut member along the shaft 12 likewise shows no appreciable increase in load on the motor.

Figure 4:
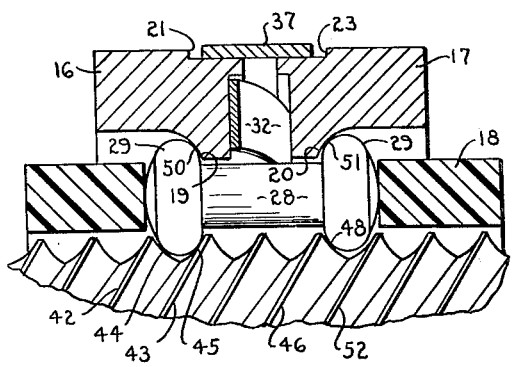
FIGURE 4 is an enlarged partial cross-sectional view of certain operative parts of my improved nut-and-screw type motion-transmitting device.

FIGURE 4 illustrates in an enlarged view some of the advantages of my improved nut-and-screw type motion-transmitting device. In forming threads on a piece of stock, whether by rolling or cutting, it is almost impossible to hold the lead of the resulting thread to a particular value without substantially increasing the production cost of the thread. The error in the lead of the thread results from a difference in hardness of the material along the length of the stock as well as from errors inherent in the forming machines, dies, tool and the like. In a nut-and-screw device of the type described above, the bearing elements 28 are manufactured with the enlarged bearing surfaces 29 spaced apart a predetermined amount sufficient to span a given number of screw threads of a particular lead when assembled in a nut on the shaft 12.

In FIGURE 4 the threads on the screw 12 have lead errors of the type just described which will cause the bearing surfaces 29 of the rolls 28 to contact the threads in other than the theoretical type of contact normally desired. For instance, in FIGURE 4, the left-hand bearing surface 29 contacts the threads 42, 43 at 44, 45, respectively, while the right-hand bearing surface 29 contacts only the thread 46 at 48. This contact has a tendency to cant the longitudinal axis of the bearing 28 in a direction away from the longitudinal axis of the screw although the longitudinal axis of the bearing element 28 is still in the plane common with the longitudinal axis of the screw. Due to the radial cant of the axis of the bearing 28, the contact between the bearing surface 29 and the raceways 19 and 20 of the halves 16 and 17 of the ring member 15 will be at points or spots 50, 51, respectively, spaced different distances away from the axis of the shaft. The above-mentioned contact is created by the split in the ring member 15 into two spring-urged halves which provide freedom for the one half of the ring to shift radially outward relative to the other half on one side of the shaft, or for the one half to move closer to the other on one side of the shaft to accommodate for the lead errors around the helix of the thread on the shaft. When the nut member is not loaded, the urging of the washer 32 on the halves 16 and 17 will have a tendency to align the axis of the roller element 28 into substantial parallelism with the axis of the shaft 12, whereby the inner contact surfaces 29 of the elements 28 will contact the threads 43, 46 at the two spaced points or spots 45, 48 with no contact on threads 42 and 52.

FIGURE 4 also can be used to illustrate another problem that has been troublesome in the industry; namely, holding, during manufacture, the spacing between the enlarged bearing surfaces 29 on each bearing element 28 to a predetermined minimum error. Many minor variations are sometimes manufactured into the bearing surface 29 such that, even though the leads of the threads of the screw member 12 are accurate, the oversized spacing or the undersized spacing of the bearing surfaces 29 will force the bearing element 28 away from the axis of the screw. For instance, if the bearing surfaces are too close together, a condition substantially the same as that illustrated in FIGURE 4 would result. Assuming the bearing surfaces 29 are spaced too close together, the contact of the surfaces 29 with the threaded member and with the raceways will be different from the ideal condition; namely, the right-hand bearing element will contact the thread at only the one point 48 and will contact the raceway 20 of the half 17 of the ring member 15 at 51, which is spaced a different distance away from the axis of the shaft than the contact 50 on raceway 19 of the corresponding left-hand bearing surface 29. The half 17 is accordingly displaced radially on one side with respect to the other half 16 in the vicinity of that particular roller. As the nut member 11 moves along the axis of the screw, the bearing elements 28 successively will have substantially the designed contact and occasionally only partial contact, such as the type shown in FIGURE 4. The outward appearance of the ring member, as it moves along the shaft 12, is one in which the two halves 16 and 17 appear to gyrate radially with respect to each other as the nut moves over portions of the threads having lead errors. The same gyrating motion may be caused by both lead errors in the threads and undersized or oversized bearing elements as discussed above.

Under prior devices, any lead errors beyond a very limited range or any minor variations in thread shape or a roller element sized beyond a predetermined limit would cause jerky motion of the nut. That is, the nut would run smoothly for a while and then, upon arriving at an area of discontinuity in the thread shape or lead, would slow down, possibly stop and then break loose and jerk forward. With applicant's improved split spring-loaded ring member, these above-noted manufacturing variations cause no problems in the assembly of the device or in the operation of the finished product.

In operation under load, referring to FIGURE 4, the screw may be rotated in a direction to urge the nut member 11 to the right. The forces will be transmitted from thread 42 through the spot 44 to the bearing surface 29, through the bearing surface 29 to the raceway 19 of half 16, then to the bracket 37 attached to the work load. The force couple acting on the left-hand bearing surface 29 will attempt to cant the axis of the bearing element 28 away from the axis of the screw so as to establish the contact between the left-hand bearing surface 29 with the spot 44 on thread 42 and spot 45 on thread 43. The right-hand bearing surface 29 will be urged against the raceway 20 of the ring half 17 with a force tending to compress the spring washer 32 against ring half 16. The spring will hold the ring half 17 in reactive contact with the roller element 28, hold the axis of the roller element 28 in the plane of the axis of the shaft, compensate for any lead errors in the threads and manufacturing variations in the roller elements 28, and compensate for wear between the various operative parts.

Figure 5:
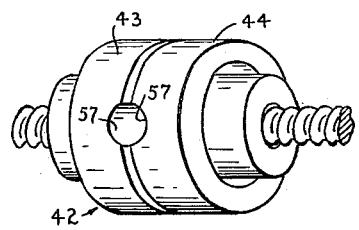
FIGURE 5 is a perspective view of a modified form of the nut-and-screw type motion-transmitting device.

FIGURE 5 illustrates a modified form of nut 11 wherein the attachment of the ring member to a work load is changed. In FIGURE 5, the halves 43 and 44 of the ring member 42 have semicircular oppositely disposed apertures 57 formed in the diametrically opposite outwardly facing sides thereof in such a way that a pair of inwardly disposed pins (not shown) may be seated in the apertures for attachment of the nut member to the work load. The remainder of the nut element is substantially the same as that shown and described with respect to FIGURES 1 to 4.

Figure 6:
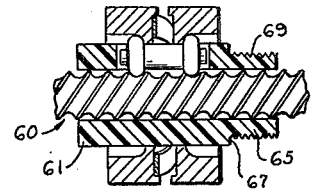
FIGURE 6 is a cross-sectional view of a modified form of my invention.
Figure 7:
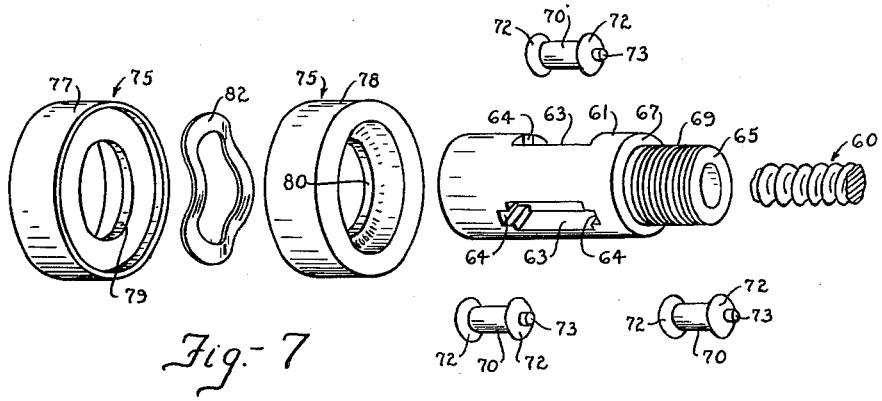
FIGURE 7 is an enlarged exploded perspective view of the nut-and-screw device of FIGURE 6.
Figure 8:
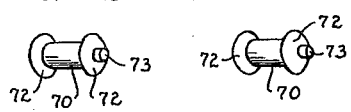
FIGURE 8 is an enlarged view of a modified type of bearing contact between a roller element and a carrier element.

FIGURES 6, 7 and 8 illustrate a modified form of my invention wherein a multiple-threaded member 60 is generally mounted for rotation about its longitudinal axis in either a clockwise or counterclockwise direction. Loosely surrounding a portion of the threaded member 60 is a tubular carrier member 61 having a plurality of radially disposed equally spaced-apart windows 63 formed through the cylindrical wall thereof and having axially extending reduced portions or radially extending grooves 64 formed in the end walls of the windows 63. A sleeve member 65 of reduced outside diameter is integrally formed on and extends axially from one end portion of the carrier member 61 to form a shoulder 67 therebetween. The sleeve member 65 has a threaded peripheral surface 69 which is adapted for attaching the carrier 61 to a work load (not shown) for moving the work load along the axis of the shaft 60.

A number of bearing or roller elements 70, equal in number to the windows 63, are nested in the windows 63 and have enlarged spaced-apart bearing surfaces 72 and axially extending pintles 73 integrally formed therewith. The pintles 73 have an outside diameter slightly smaller than the circumferential width of the reduced portions or grooves 64 of the windows 63. The fit between the pintles 73 and the portions 64 is relatively close, such that the roller elements 70 are free to turn about their longitudinal axes in an unrestrained manner. The close fit between the pintles 73 and portions 64 has a tendency to stabilize the roller elements and to hold the longitudinal axis of the roller elements in substantially a common plane with the axis of the shaft 60. Under conditions where heavy loads are to be transmitted, where loads are to be picked up suddenly, or where a life expectancy of extended duration is required, the pintles 73 on the roller elements 70 and the walls of the reduced portion or groove 64 in the carrier 61 may be hardened, provided with inserts or provided with some other bearing means adapted to adequately carry the loads and resist wear.

A ring member 75 loosely surrounds a portion of the carrier member 61 and is divided into two halves 77, 78 having internal raceways 79, 80, respectively, facing in opposite directions so as to engage the inner portions of the bearing surfaces 72 of the rollers 70. A resilient member or spring washer 82 is positioned between the adjoining faces of the halves 77 and 78 and has a plurality of wave formations acting successively against said opposite faces to urge the halves apart, whereby the raceways 79 and 80 engage the inner portions of the bearing surfaces 72 with a reactive force sufficient to produce the driving relation desired.

In operation, the nut and attached work load of FIGURE 7 is moved axially along the threads of the shaft 60 upon rotation of the shaft. Since the work load is attached to the sleeve member 65 on the carrier 61, it will be advanced a predetermined amount for each turn of the shaft 60. The ring member 75 is not attached to the work load or output and serves as a retaining element for the bearing members 70 to provide the reactive force for creating the driving connection for the carrier from the shaft 60. The ring member 75 will rotate in a direction opposite to the direction of rotation of the screw member 60 as the carrier 61 moves along the axis of the shaft. The spring washer 82 will urge the raceways 79 and 80 into contact with the bearing surfaces 72 on the bearing elements 70 so as to compensate for wear on any of the operative parts, to create the necessary reactive force for the drive, to compensate for lead errors in the threads of the shaft 60 and to compensate for tolerance variations between the bearing surfaces 72 of each bearing element 70, substantially as described with respect to FIGURES 1 to 4. The chief difference is, of course, due to the fact that the drive is taken from the carrier 61 whereby no freewheeling will be inherent in the nut at the opposite ends of its path of travel.

It is to be understood that the form of bearing element 70 and pintle mounting shown in FIGURES 6–8 could be used in the form of invention shown in FIGURES 1 through 4 and vice versa without departing from the spirit of this invention.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A motion-transmitting device comprising inner and outer concentrically disposed relatively rotatable members, said members including inner and outer race means carried respectively thereon, roller means simultaneously engaging both race means for operatively connecting said rotatable members, said roller means including a central generally cylindrical portion the axis of which extends substantially parallel to the axes of said rotatable members and a pair of radially enlarged end portions joined by said cylindrical portion and presenting a pair of spaced-apart bearing surfaces engaging said race means, one of the race means comprising two axially spaced-apart elements having oppositely facing raceways respectively adapted to engage the adjacent surface portions of the bearing surfaces, and resilient means urging the two elements away from each other into driving eagagement with the bearing surfaces of the roller means whereby a driving connection is created between the rotatable members.

2. A device as claimed in claim 1 wherein the race means on the inner rotatable member comprises a thread adapted, when the inner member is rotated, to provide an axial thrust to the outer rotatable member.

3. A device as claimed in claim 2 wherein said roller means includes a plurality of rollers, and cage means are disposed between the inner and outer rotatable members for positioning said rollers circumferentially of the inner rotatable member.

4. A device as claimed in claim 3 wherein stop means are provided on opposite ends of the threaded inner rotatable member in position to be engaged by said cage means whereby the outer member is permitted to freewheel relative to the inner member upon contact between said cage means and either of said stops.

5. A motion-transmitting means comprising inner and outer concentrically disposed relatively rotatable members, roller means interposed between said members for operatively connecting said rotatable members, said roller means each including a central generally cylindrical portion the axis of which extends substantially parallel to the axes of said rotatable members and a pair of radially enlarged end portions joined by said cylindrical portion and presenting a pair of spaced-apart bearing surfaces engaging said rotatable members, a cage means interposed between said members for positioning the roller means relative to each other circumferentially of said inner member, a race means on one of said rotatable members for engaging the roller means and comprising two separable parts, and means for urging the separable parts away from each other and into driving connection with the roller means.

6. A motion-transmitting device comprising a rotatably driven threaded shaft, an axially movable output member surrounding said shaft in spaced relationship thereto, roller means between and operatively connecting the output member and the shaft, said roller means each including a central generally cylindrical portion the axis of which extends substantially parallel to the axis of said shaft and a pair of radially enlarged end portions joined by said cylindrical portion and presenting a pair of spaced-apart bearing surfaces engaging said shaft and output member, a pair of oppositely facing raceways formed in said output member for engaging the bearing surfaces of the roller means, said output member being divided into two parts, and means for urging said two parts away from each other whereby the raceways therein operatively contact the bearing surfaces of the roller means.

7. A motion-transmitting device including a rotatable threaded shaft, race means spaced radially from the shaft and substantially encircling a portion of the threaded shaft, roller means simultaneously engaging the threads of the shaft and the race means, said roller means each including a central generally cylindrical portion the axis of which extends substantially parallel to the axis of said shaft and a pair of radially enlarged end portions joined by said cylindrical portion and presenting a pair of spaced-apart bearing surfaces engaging said shaft and race means, the race means comprising separate axially spaced-apart halves, each half having a raceway facing away from the other half, and resilient means between said halves to urge the halves of said race means away from each other and into engagement with the bearing surfaces of the roller means to maintain the foregoing elements of the device in driving contact at all times regardless of wear.

8. A motion-transmitting device including a rotatable threaded shaft, an outer member spaced radially from the shaft and substantially encircling a portion of the threaded shaft, roller means simultaneously engaging the threads of the shaft and the outer member, said roller means each including a central generally cylindrical portion the axis of which extends substantially parallel to the axis of said shaft and a pair of radially enlarged end portions joined by said cylindrical portion and presenting a pair of spaced-apart bearing surfaces engaging said shaft and said outer member, cage means interposed between said shaft and said outer member for spacing said roller means about said shaft, said outer member comprising separate axially spaced-apart elements, each element having a raceway facing away from the other element, and means for urging the elements of said outer member away from each other and into engagement with the bearing surfaces of the roller means whereby rotation of the shaft produces axial movement of the cage means and outer member.

9. A device as claimed in claim 8 wherein the outer member comprises an output member which is operatively connected to a work load for linear movement thereof.

10. A device as claimed in claim 9 wherein stop means are carried by opposite ends of the shaft in position to be engaged by said cage means whereby the outer member may freewheel relative to the shaft upon contact between said cage means and one of said stop means.

11. A device as claimed in claim 8 wherein the cage member comprises an output member which is operatively connected to a work load for linear movement thereof.

12. A motion-transmitting device including a rotatable threaded member, roller means operatively engaging the threaded member, a cage member loosely encircling a portion of the threaded member and housing the roller means, a race member loosely encircling said cage member and being split along a plane substantially perpendicular to the axis of the threaded member, a raceway formed in each divided part of the race member, the raceway in each part facing away from the other part, each roller means straddling the split in the race member and engaging with the oppositely facing raceways, and means for urging the parts of the race member away from each other so as to engage the raceways with the roller means.

13. A motion-transmitting means comprising inner and outer concentrically disposed relatively rotatable members, roller means interposed between said members for operatively connecting said rotatable members, said roller means each including a central generally cylindrical portion the axis of which extends substantially parallel to the axes of said rotatable members and a pair of radially enlarged end portions joined by said cylindrical portion and presenting a pair of spaced-apart bearing surfaces engaging said rotatable members, race means on one of said rotatable members for engaging the roller means and comprising two separable parts, and means for urging the separable parts away from each other and into driving connection with the roller means.

References Cited in the file of this patent
UNITED STATES PATENTS

| | | |
|---|---|---|
| 2,690,682 | Passman | Oct. 5, 1954 |
| 2,714,005 | Wise | July 26, 1955 |
| 2,739,491 | Russell | Sept. 13, 1956 |
| 2,842,978 | Orner | July 15, 1958 |